US012732548B2

(12) United States Patent
Schott et al.

(10) Patent No.: US 12,732,548 B2
(45) Date of Patent: Sep. 8, 2026

(54) METHOD FOR REALIZING COMMUNICATION SESSIONS USING A TELECOMMUNICATIONS NETWORK

(71) Applicant: Deutsche Telekom AG, Bonn (DE)

(72) Inventors: Roland Schott, Bad Nauheim (DE); Michael Kreipl, Nuremberg (DE); Bastian Dreyer, Hanstedt (DE); Roland Jesske, Laudenbach (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 18/563,946

(22) PCT Filed: May 2, 2022

(86) PCT No.: PCT/EP2022/061708
§ 371 (c)(1),
(2) Date: Nov. 24, 2023

(87) PCT Pub. No.: WO2022/248166
PCT Pub. Date: Dec. 1, 2022

(65) Prior Publication Data

US 2024/0259438 A1 Aug. 1, 2024

(30) Foreign Application Priority Data

May 27, 2021 (EP) .................................... 21176264

(51) Int. Cl.
*H04L 65/1069* (2022.01)
*H04L 65/1073* (2022.01)
*H04L 65/1104* (2022.01)
*H04L 65/80* (2022.01)

(52) U.S. Cl.
CPC ...... *H04L 65/1069* (2013.01); *H04L 65/1073* (2013.01); *H04L 65/1104* (2022.05); *H04L 65/80* (2013.01)

(58) Field of Classification Search
CPC ............ H04L 65/1069; H04L 65/1104; H04L 65/1073; H04L 65/80
(Continued)

(56) References Cited

U.S. PATENT DOCUMENTS

2013/0230042 A1* 9/2013 Shatsky .............. H04L 65/1104 370/352
2017/0126747 A1* 5/2017 Merino Vazquez ......................... H04L 65/1046

FOREIGN PATENT DOCUMENTS

WO WO 2020/167616 * 2/2020 ............ H04L 29/06
WO WO 2020167616 A1 8/2020
WO WO 2021044271 A1 3/2021

OTHER PUBLICATIONS

Camarillo et al., "RFC 5002—The Session Initiation Protocol (SIP) P-Profile-Key Private Header (P-Header)", 2007, p. 1-7, Network Working Group (Year: 2007).*
(Continued)

*Primary Examiner* — Taylor A Elfervig
(74) *Attorney, Agent, or Firm* — Leydig, Voit & Mayer, Ltd.

(57) ABSTRACT

A method for realizing communication sessions using a network and involving a user equipment is provided. In order to establish a communication session regarding the user equipment, a signaling session is initiated using a register message and an invite message according to a session initiation protocol, wherein the signaling session is handled by a processing entity of the network. The method comprises the register message being received by the processing entity, and the processing entity generating a product identifier information that is indicative of a product alternative used by the user equipment from a plurality of product alternatives. The product identifier information is transmitted to the user equipment, and the invite message is
(Continued)

received by the processing entity, wherein the invite message comprises the product identifier information, and wherein the invite message is handled, by the processing entity in dependence of the product identifier information received from the user equipment.

16 Claims, 2 Drawing Sheets

(58) Field of Classification Search
USPC .......................................................... 709/228
See application file for complete search history.

(56) References Cited

OTHER PUBLICATIONS

Camarillo et al., "RFC 3312—Integration of Resource Management and Session Initiation Protocol (SIP)", 2002, p. 1-30, Network Working Group (Year: 2002).*

Jesske et al., "RFC 7315—Private Header (P-Header) Extensions to the Session Initiation Protocol (SIP) for the 3GPP", IETF, Jul. 2014, p. 1-43 (Year: 2014).*

J. Costa-Requena and Haitao Tang, "Enhancing SIP with spatial location for emergency call services," Proceedings Tenth International Conference on Computer Communications and Networks (Cat. No.01EX495), Scottsdale, AZ, USA, 2001, pp. 326-333 (Year: 2001).*

N. Vrakas, D. Geneiatakis and C. Lambrinoudakis, "Evaluating the Security and Privacy Protection Level of IP Multimedia Subsystem Environments," in IEEE Communications Surveys & Tutorials, vol. 15, No. 2, pp. 803-819, Second Quarter 2013 (Year: 2013).*

M. Knappmeyer, B. Ricks, R. Tonjes and A. Al-Hezmi, "Advanced Multicast and Broadcast Content Distribution in Mobile Cellular Networks," IEEE Globecom 2007—IEEE Global Telecommunications Conference, Washington, DC, USA, 2007, pp. 2097-2101 ( Year: 2007).*

T. Raty, J. Sankala and M. Sihvonen, "Network traffic analyzing and monitoring locations in the IP multimedia subsystem, " 31st EUROMICRO Conference on Software Engineering and Advanced Applications, Porto, Portugal, 2005, pp. 362-369 (Year: 2005).*

* cited by examiner

METHOD FOR REALIZING COMMUNICATION SESSIONS USING A TELECOMMUNICATIONS NETWORK

CROSS REFERENCE TO RELATED APPLICATIONS

This application is a U.S. National Phase application under 35 U.S.C. § 371 of International Application No. PCT/EP2022/061708, filed on May 2, 2022, and claims benefit to European Patent Application No. EP 21176264.6, filed on May 27, 2021. The International Application was published in English on Dec. 1, 2022 as WO 2022/248166 A1 under PCT Article 21(2).

FIELD

The present invention relates to a method for realizing communication sessions using a telecommunications network and involving at least one user equipment, wherein—in order to establish a communication session regarding the user equipment—the user equipment initiates a signaling session using at least one register message and at least one invite message according to the session initiation protocol, SIP.

Furthermore, the present invention relates to a telecommunications network for realizing communication sessions using the telecommunications network and involving at least one user equipment as well as a processing entity or functionality of the telecommunications network, wherein—in order to establish a communication session regarding the user equipment—a signaling session is initiated by means of the telecommunications network receiving at least one register message and at least one invite message according to the session initiation protocol, SIP.

Additionally, the present invention relates to a processing entity or functionality for realizing communication sessions using a telecommunications network and involving at least one user equipment as well as the processing entity or functionality of the telecommunications network, wherein—in order to establish a communication session regarding the user equipment—a signaling session is initiated by means of the processing entity or functionality receiving at least one register message and at least one invite message according to the session initiation protocol, SIP.

Furthermore, the present invention relates to a user equipment for realizing communication sessions using a telecommunications network and involving the user equipment as well as a processing entity or functionality of the telecommunications network, wherein—in order to establish a communication session regarding the user equipment—the user equipment initiates a signaling session using at least one register message and at least one invite message according to the session initiation protocol, SIP.

Furthermore, the present invention relates to a program and to a computer-readable medium for realizing communication sessions using a telecommunications network and involving at least one user equipment according to the inventive method.

BACKGROUND

In conventional implementations of networks or telecommunications networks based on or implementing the IP multimedia subsystem, often dedicated IMS components are rolled out mapping similar but in detail different products; hence, due to such products being—at least slightly—different (and, hence, require a different handling by network components) no multiplex gain is easily possible to be realized, as, often, the product differentiation needs to be realized by means addressing product-specific network nodes or servers based on, e.g., DNS resolution.

SUMMARY

In an embodiment, the present disclosure provides a method for realizing communication sessions using a telecommunications network and involving at least one user equipment, wherein, in order to establish a communication session regarding the at least one user equipment, the at least one user equipment initiates a signaling session using at least one register message and at least one invite message according to a session initiation protocol (SIP), wherein the signaling session is handled by a processing entity or functionality of the telecommunications network, wherein the method comprises: in a first step, the at least one register message is received by the processing entity or functionality, and the processing entity or functionality generates or retrieves or requests a product identifier information, the product identifier information being indicative of a product alternative used by the at least one user equipment out of a plurality of different product alternatives, in a second step, the product identifier information is transmitted to the at least one user equipment, in a third step, the at least one invite message is received by the processing entity or functionality, wherein the at least one invite message comprises the product identifier information, and wherein the at least one invite message is handled, by the processing entity or functionality, in dependence of the product identifier information received from the at least one user equipment.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
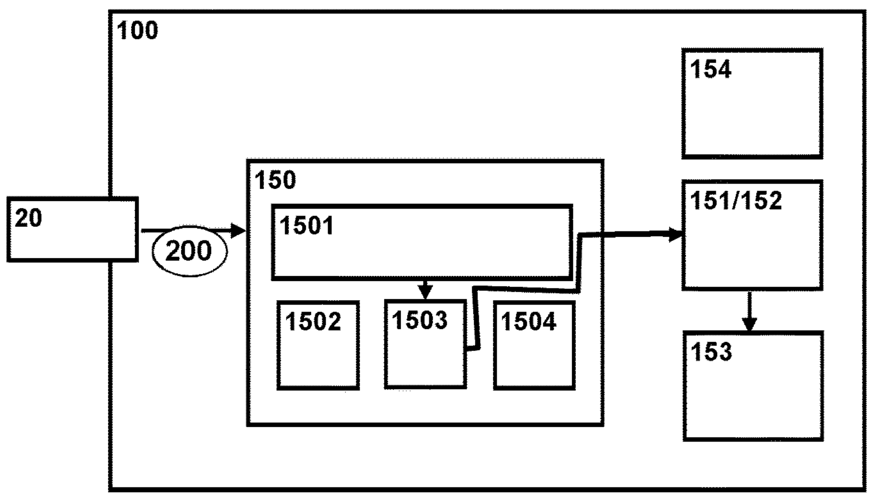
FIG. 1 schematically illustrates a telecommunications network and a user equipment contacting a processing entity or functionality.

In accordance with an embodiment, the present invention provides a technically simple, effective and cost-effective solution for realizing communication sessions using a telecommunications network and involving at least one user equipment, wherein different products are easily distinguishable such that, e.g., multiplex gains are able to be realized, especially for different products or services that are similar (but in detail different). In another embodiment, the present invention provides a corresponding telecommunications network, a corresponding processing entity or functionality, a corresponding user equipment, and a corresponding program and computer-readable medium.

In accordance with another embodiment, the present invention provides a method for realizing communication sessions using a telecommunications network and involving at least one user equipment, wherein—in order to establish a communication session regarding the user equipment—the user equipment initiates a signaling session using at least one register message and at least one invite message according to the session initiation protocol, SIP, wherein the signaling session is handled by a processing entity or functionality of the telecommunications network, wherein the method comprises the following steps:

in a first step, the register message is received by the processing entity or functionality, and the processing entity or functionality generates or retrieves or requests a product identifier information, the product identifier information being indicative of a product alternative used by the user equipment out of a plurality of different product alternatives, in a second step, the product identifier information is transmitted to the user equipment, in a third step, the invite message is received by the processing entity or functionality, wherein the invite message comprises the product identifier information, and wherein the invite message is handled, by the processing entity or functionality, in dependence of the product identifier information received from the user equipment.

It is thereby advantageously possible according to the present invention to effectively and comparatively easily realize multiplex gains instead of being obliged to provide dedicated IMS components that need to be rolled out mapping the appropriated (specific) products without a multiplex gain being able to be realized between their capacity per product.

Especially, in conventional networks, especially IMS networks, several products (or services) are being used or provided to user equipment or subscribers of the telecommunications network. In such conventional IMS networks, the IP multimedia subsystem network itself is often unable to differentiate the various customer products connected because no identifier or indication is available or defined within the IP multimedia subsystem network or provided by the user equipment. For example, such different or various products require a differentiated treatment (at least a slightly differentiated treatment) in the IMS components like P-CSCF (proxy call state control function, outbound proxy respectively) or application server (AS). Conventionally, different P-CSCF (i.e. units or entities or instances thereof) are required to handle the different products, i.e. specifically according to the respective product; in such conventional networks, such different entities (e.g. P-CSCFs) are addressed by the client (i.e. the user equipment), e.g., via eDNS resolution, leading to the requirement, for the service or network provider respectively, that for each (e.g. slightly different) product (or service) a dedicated unit or entity or instance (such as, e.g., a P-CSCF) may be provided with dedicated reserved capacity for each of these units or entities or instances with a (especially slightly) different profiling. This results in many such different units or entities or instances (e.g. P-CSCFs) that need to be implemented in conventional telecommunications networks. Furthermore, this requires—in case of moving the IP multimedia subsystem network into a virtual or cloud environment—the dedicated IMS components need to be migrated to VNFs (virtual network functions) or CNF (cloud native network functions/container network functions). One basic concept of virtualization or cloud is that the different VNFs/CNFs are able to scale in or out. However, since in conventional networks the IMS products are not able to be distinguished (other than by differentiated addressing) the mentioned planning concept (requiring separate or dedicated units or entities or instances for each (especially slightly varying) product) is adopted for the new technology as well, yielding to the situation that for each product a dedicated P-CSCF as PNF (Physical Network Function), CNF or VNF is required in conventional telecommunications networks.

According to the present invention, the user equipment initiates a signaling session using at least one register message and at least one invite message according to the session initiation protocol, SIP, wherein the signaling session is handled by a processing entity or functionality (such as, e.g., a proxy-call state control function or another dedicated unit or entity or instance) of the telecommunications network, wherein in a first step, the register message is received by the processing entity or functionality followed by the processing entity or functionality generating or retrieving or requesting a product identifier information being indicative of the product alternative used by the user equipment (out of a plurality of different product alternatives), and wherein in a (especially but not necessarily subsequent) second step the product identifier information is transmitted to the user equipment. Hence, it is possible, in a third step, that a subsequent invite message (received by the processing entity or functionality) comprises the product identifier information such that it is possible, for the processing entity or functionality, to handle the received invite message in dependence of the product identifier information received from the user equipment, i.e. adequately.

Moreover, such (slightly) different products might also use different applications and different application servers or a different profiling of the application itself. The product Identifier information according to the present invention might also be used to identify the correct application or the correct profiling within the AS (or other IMS component or processing entity or functionality). Additionally, the filter criteria (used to connect to the related application server) used within the S-CSCF can be shortened and allow a more efficient selection of the application server.

This is even more important in the virtualized or cloud environment because here, the VNF might be decomposed into VNF-C (VNF-Components) or might use microservices. Hence, according to the present invention—instead of scaling of the whole IMS component, e.g. the whole application server—, the product identifier information enables that only the sub-component (of the respective processing entity or functionality, or unit or entity or instance, e.g. proxy call state control function or application server) that generates the different service behavior (of each different product of a certain number of similar products) can be scaled in or out resulting in a more efficient usage of the network capacity. The approach also allows the concept of a generic (or even unique) IMS component, e.g. P-CSCF, for all services whereas only the sub-function for profiling the products or services are scaled in or out. Hence, according to the present invention, such benefits regarding network capacity and network planning are able to be realized.

Such benefits (i.e. such as, e.g., the use of a product identifier information being part of an invite message, sent by the user equipment and received by the processing entity or functionality, comprising the product identifier information) are unable to be achieved by the conventionally known approach such as the use of a slice identifier or a service identifier in the 5G network slicing context. Such a slice identifier might help to build separate virtual networks for, e.g., VOLTE Voice (Voice over LTE, Long Term Evolution), VOLTE M2M (machine-to-machine communication) or fixed network, and it might ensure in practice that the service is getting the appropriate quality-of-service handling (e.g., by using the correct quality of service parameter). However, such service identifier is mainly used to signal the required slice or quality-of-service level over networks (or network boundaries) of different service providers ensuring that a service is getting its requested or required resources or quality.

However, sharing, e.g., a virtual P-CSCF via network slicing will not help to implement product-specific procedures since the P-CSCF slices typically has all the same configuration for one specific product; by means of network slicing, a commonly used resource is only shared for groups of users expecting the same behavior from a P-CSCF.

However, by means of using a product identifier information according to the present invention, it is advantageously possible to allow that the different groups of users are also able to have different products, i.e. it applies for different products (or product identifiers or different pieces of product identifier information) within one network slice. In case multiple network slices are available, product identifiers are able to be unique within one slice or reused in a different network slice, e.g. in case a different quality-of-service behavior is required.

According to the present invention, it is advantageously possible and preferred that, the invite message comprises the product identifier information as a session initiation protocol header or header field, especially as a private-product-identifier header or header field, especially according to RFC 7315, wherein especially the product identifier information comprises—besides a product-related information or product-related information content—at least one further parameter or information content, wherein the further parameter or information content is especially related to a quality-of-service level or indication and/or a latency level or indication.

By means of the invite message comprising the product identifier information as a session initiation protocol header or header field, especially as a private-product-identifier header or header field, especially according to RFC 7315, it is advantageously possible, according to the present invention, to transmit the product identifier information in an easy and straightforward manner.

Additionally or alternatively, by means of the product identifier information comprising—besides a product-related information or product-related information content—at least one further parameter or information content, especially being related to a quality-of-service level or indication and/or a latency level or indication, it is advantageously possible, according to the present invention, to additionally differentiate the service provision of the telecommunications network (i.e. especially the processing of the user equipment-initiated requests or request messages) in order to account not only for different products or product variants but also to provide a differentiation regarding, e.g., quality-of-service and/or latency.

According to the present invention, it is furthermore advantageously possible and preferred that the invite message comprises the product identifier information as a session initiation protocol uniform resource identifier parameter, SIP URI parameter.

Thereby, it is likewise advantageously possible to transmit the product identifier information in an easy and straightforward manner.

Furthermore, it is advantageously possible and preferred according to the present invention that—in the second step—the product identifier information is transmitted to the user equipment as part of a register answer message, especially subsequent to the first step, the register answer message being related to the register message received from the user equipment.

It is thereby advantageously possible, according to the present invention, to efficiently transmit the product identifier information as part of the registration procedure of the user equipment with the telecommunications network.

According to the present invention, it is furthermore advantageously possible and preferred that the product identifier information is transmitted to the user equipment by means of an autoconfiguration method or mechanism, especially as defined in technical report 069 of the Broadband Forum, or by means of or as part of a universal integrated circuit card, especially as part of a subscriber identity module, of the user equipment.

It is thereby advantageously possible, according to the present invention, to efficiently transmit the product identifier information to the user equipment in an easy and straightforward manner.

According to the present invention, it is advantageously furthermore possible and preferred that the processing entity or functionality is or corresponds to a call state control function, CSCF, as part of the telecommunications network, especially a proxy call state control function P-CSCF, wherein the processing entity or functionality retrieves or requests the product identifier information from a repository entity or functionality of the telecommunications network, especially based on a user profile information associated to the user equipment,

- wherein especially the product identifier information is retrieved or requested by means of at least one out of the following:
  - a server assignment request, SAR, and a server assignment answer, SAA,
  - a hypertext transfer protocol 2.0 exchange, HTTP/2.0 exchange, over a service based interface (Nudr/Nudsf),
- wherein especially the repository entity or functionality is or corresponds to a home subscriber server of the telecommunications network or to a unified data repository, UDR, or to a unstructured data storage function, UDSF, of the telecommunications network,
- wherein especially the product identifier information is retrieved or requested
  - by means of using at least one attribute-value-pair, AVP, or
  - by means of using an e2 request (according to the IMS standard), or
  - by means of using a representational state transfer interface, REST interface, or
  - by means of using a generic database interface,
- between the processing entity or functionality and the repository entity or functionality.

According to the present invention, it is furthermore advantageously possible and preferred that the processing entity or functionality is or corresponds to an application server as part of the telecommunications network or associated to the telecommunications network.

According to the present invention, it is advantageously furthermore possible and preferred that handling or processing of the invite message by the processing entity or functionality is at least partly different dependent on the information content of the product identifier information,

- wherein especially, in dependence of the information content of the product identifier information, different components or microservices or sub-functions of the processing entity or functionality, especially different virtual network function components, are used for at least partly handling or processing the corresponding request.

By means of an at least partly different handling or processing of the invite message, by the processing entity or functionality, dependent on the information content of the product identifier information, it is advantageously possible according to the present invention to realize the processing entity or functionality as a generic (or at least more generic) processing entity or functionality; thereby, it is advantageously possible, e.g., to deploy or to provide only one processing entity or functionality for a plurality of products or product variants such that a higher degree of flexibility in providing network performance is possible according to the present invention. Additionally, by means of using different components or microservices or sub-functions of the processing entity or functionality, it is advantageously possible to address for the (comparatively slight) differences between different product variants handled by one and the same (generic) processing entity or functionality.

According to the present invention, it is furthermore advantageously possible and preferred that the telecommunications network is an IP multimedia subsystem network.

Furthermore, the present invention relates to a telecommunications network for realizing communication sessions using the telecommunications network and involving at least one user equipment as well as a processing entity or functionality of the telecommunications network, wherein—in order to establish a communication session regarding the user equipment—a signaling session is initiated by means of the telecommunications network receiving at least one register message and at least one invite message according to the session initiation protocol, SIP, wherein the signaling session is handled by the processing entity or functionality of the telecommunications network, wherein the telecommunications network is configured such that:

the register message is received by the processing entity or functionality, and the processing entity or functionality generates or retrieves or requests a product identifier information, the product identifier information being indicative of a product alternative used by the user equipment out of a plurality of different product alternatives, the product identifier information is transmitted to the user equipment, the invite message is received by the processing entity or functionality, wherein the invite message comprises the product identifier information, and wherein the invite message is handled, by the processing entity or functionality, in dependence of the product identifier information received from the user equipment.

Furthermore, the present invention relates to a processing entity or functionality for realizing communication sessions using a telecommunications network and involving at least one user equipment as well as the processing entity or functionality of the telecommunications network, wherein—in order to establish a communication session regarding the user equipment—a signaling session is initiated by means of the processing entity or functionality receiving at least one register message and at least one invite message according to the session initiation protocol, SIP, wherein the signaling session is handled by the processing entity or functionality of the telecommunications network, wherein the processing entity or functionality is configured such that:

the register message is received by the processing entity or functionality, and the processing entity or functionality generates or retrieves or requests a product identifier information, the product identifier information being indicative of a product alternative used by the user equipment out of a plurality of different product alternatives, the product identifier information is transmitted to the user equipment, the invite message is received by the processing entity or functionality, wherein the invite message comprises the product identifier information, and wherein the invite message is handled, by the processing entity or functionality, in dependence of the product identifier information received from the user equipment.

Furthermore, the present invention relates to a user equipment for realizing communication sessions using a telecommunications network and involving the user equipment as well as a processing entity or functionality of the telecommunications network, wherein—in order to establish a communication session regarding the user equipment—the user equipment initiates a signaling session using at least one register message and at least one invite message according to the session initiation protocol, SIP, the signaling session being able to be handled by a processing entity or functionality of the telecommunications network, wherein the user equipment is configured such that:

the user equipment transmits the register message to the processing entity or functionality, and the processing entity or functionality generates or retrieves or requests a product identifier information, the product identifier information being indicative of a product alternative used by the user equipment out of a plurality of different product alternatives, the product identifier information is received by the user equipment, the user equipment transmits the invite message to the processing entity or functionality, wherein the invite message comprises the product identifier information, and wherein the invite message is handled, by the processing entity or functionality, in dependence of the product identifier information received from the user equipment.

Additionally, the present invention relates to a program comprising a computer readable program code which, when executed on a computer or on a network node of a telecommunications network or on a user equipment or on a processing entity or functionality, or in part on a network node of a telecommunications network and/or in part on a user equipment and/or in part on a processing entity or functionality, causes the computer and/or the network node of the telecommunications network and/or the user equipment and/or the processing entity or functionality to perform the inventive method.

Still additionally, the present invention relates to a computer-readable medium comprising instructions which when executed on a computer or on a network node of a telecommunications network or on a user equipment or on a processing entity or functionality, or in part on a network node of a telecommunications network and/or in part on a user equipment and/or in part on a processing entity or functionality, causes the computer and/or the network node of the telecommunications network and/or the user equipment and/or the processing entity or functionality to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 is schematically shown being contacted by a user equipment 20 for realizing an exemplary communication session using the telecommunications network 100.

In order to establish the communication session regarding the user equipment 20, the user equipment 20 initiates a signaling session (not specifically shown in FIG. 1) using at least one register message and at least one invite message according to the session initiation protocol, SIP. The signaling session is handled by a processing entity or functionality 150 of the telecommunications network 100. The processing entity or functionality 150 is arranged to be able to handle such communication requests by user equipments 20 for different products or variants of a product. In the exemplary embodiment shown in FIG. 1, the processing entity or functionality 150 is able to handle three different product variants. Each specific product or product variant might require a common processing or common processing part within (or as part of) the processing entity or functionality 150 as well as a specific processing part within (or as part of) the processing entity or functionality 150. In the example shown, the common processing or common processing part is schematically illustrated by means of a box and reference sign 1501, whereas a first specific processing or specific processing part is schematically illustrated by means of a further box and reference sign 1502; a second specific processing or specific processing part is schematically illustrated by means of still a further box and reference sign 1503, and a third specific processing or specific processing part is schematically illustrated by means of still a further box and reference sign 1504. A product identifier information 200 is used to identify which one of the three (in the exemplary embodiment shown in FIG. 1) different products or product variants applies for a specific request of a specific user equipment 20 (and, hence, to which specific processing or specific processing part 1502, 1503, 1504 (within or as part of the processing entity or functionality 150) the corresponding request or message shall be addressed). In the exemplary embodiment shown in FIG. 1, the product identifier information 200 specifies or indicates the second specific processing or specific processing part 1503 to be relevant. Hence, the request is (after having been processed by the common processing or common processing part 1501) addressed to the second specific processing or specific processing part 1503.

In the example shown in FIG. 1, the processing entity or functionality 150 might be a proxy call state control function 150, and—after traversing this proxy call state control function as processing entity or functionality 150—the request or the message of the user equipment 20 might be directed to a further processing entity or functionality 151 (such as an interrogating call state control function 151) and/or a still further processing entity or functionality 152 (such as a serving call state control function 152)—both being schematically illustrated, in FIG. 1, only by means of one box and reference sign 151/152. According to the present invention, as the information of the product identifier information is present in the request of the user equipment 20 (shown on the left-hand side of FIG. 1), it is advantageously possible to also differentiate between the different specific products or product variants at the output of the further processing entity or functionality 151/152, i.e. in case of the information content or value of the product identifier information 200 corresponding to (or indicating) the second product variant, the request or the processing flow is directed or addressed to still a further processing entity or functionality 153 (and in case that the information content or value of the product identifier information 200 would have corresponded to (or indicated) another product variant, the request or the processing flow would have been directed or addressed to still a further processing entity or functionality 154.

In the exemplary embodiment shown in FIG. 1, the processing entities or functionalities 150, 151, 152, 153, 154 are, e.g., realized as call state control functions or related functions (especially proxy call state control function 150, interrogating call state control function 151, serving call state control function 152). However, the processing entity or functionality 150 (and/or the further processing entities 151, 152, 153, 154) schematically shown in FIG. 1 could also correspond, at least in part, to application servers 150, 151, 152, 153, 154. In addition, further applications servers or application server entities or functionalities (not represented in FIG. 1) are able to be involved in the handling and processing of the user equipment's request (comprising the product identifier information 200).

According to the present invention, in order to establish a communication session regarding the user equipment 20, the user equipment 20 initiates a signaling session using at least one register message (210, cf. FIG. 2) and at least one invite message (310, cf. FIG. 3) according to the session initiation protocol, SIP, wherein the signaling session is handled by a processing entity or functionality 150 of the telecommunications network 100.

Figure 2:
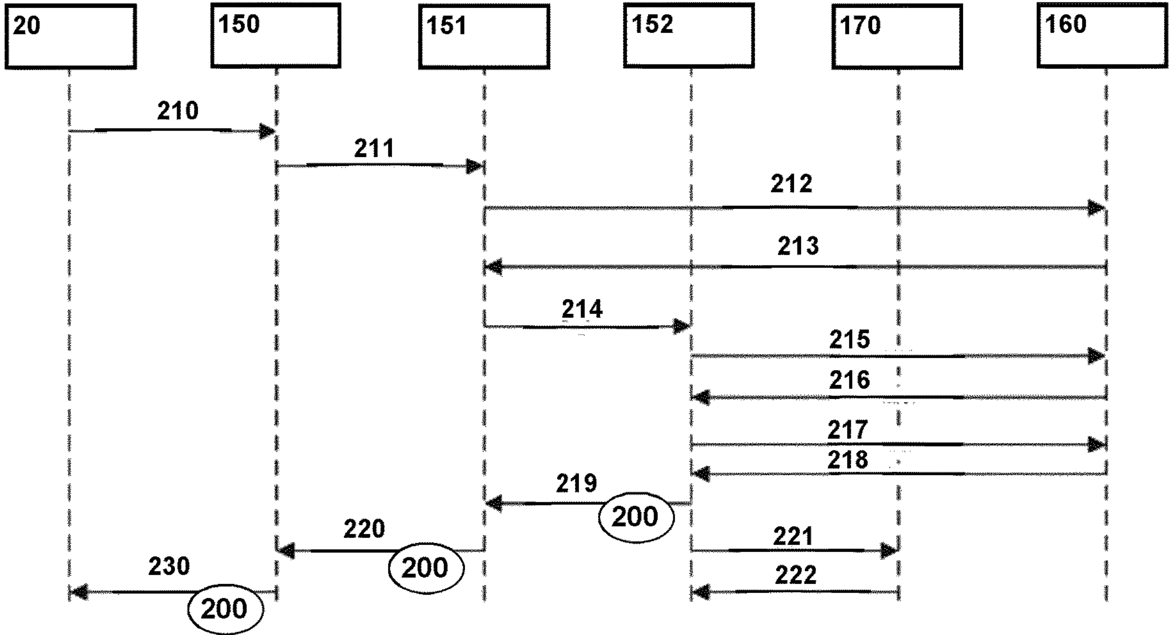
FIGS. 2 and 3 schematically illustrate a communication diagram showing the inventive method.
Figure 3:
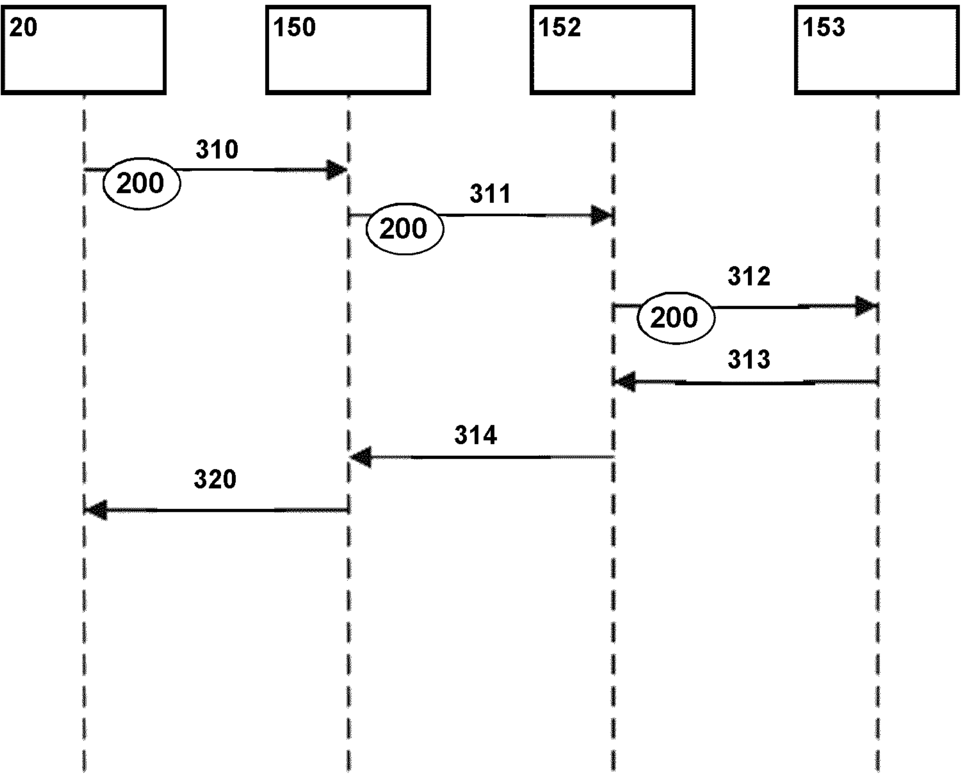

This is schematically shown in the communication diagrams of FIGS. 2 and 3. In a first step 210, a register message (also designated by reference sign 201) is sent, by the user equipment 20, to the telecommunications network 100, especially (or eventually) arriving at the processing entity or functionality 150. By means of further processing steps, the processing entity or functionality 150 generates or retrieves or requests the product identifier information 200 appropriate for the requesting user equipment 20 and/or for the requested service or product (this being done especially involving other instances, nodes or functionalities of the telecommunications network 100). The product identifier information 200 is indicative of a product alternative used by (or required by) the user equipment 20 out of a plurality of different product alternatives.

In a second step, the product identifier information 200 is transmitted to the user equipment 20. In the exemplary embodiment shown in FIG. 2, the product identifier information 200 is returned to the user equipment 20 by the processing entity or functionality 150. Especially, the product identifier information 200 is transmitted to the user equipment 20 as part of a register answer message 230, especially subsequent to the first step, the register answer message 230 being especially related to the (initial) register message 210 received from the user equipment 20.

According to the present invention, typically, the user equipment 20 is—per se—unable to identify (and, hence, to transmit) the product identifier information 200. Hence, the user equipment 20 needs to receive this information in some way. Especially, the product identifier information 200 is provided to the user equipment 20 as part of the register answer message 230, transmitted to the user equipment 20 by the processing entity or functionality 150 (and schematically shown in FIG. 2); alternatives to such a transmission mechanism or method include a transmission (to the user equipment 20 as part of the second step—that does not necessarily occur subsequent to the first step) of the product identifier information 200 by means of an autoconfiguration method or mechanism, especially as defined in technical report 069 of the Broadband Forum, or by means of or as part of a universal integrated circuit card, especially as part of a subscriber identity module, of the user equipment 20.

According to the present invention, in a third step, the invite message 310 is received by the processing entity or functionality 150 (i.e. sent by the user equipment 20, cf. FIG. 1), wherein the invite message 310 comprises the product identifier information 200, and wherein the invite message 310 is handled, by the processing entity or functionality 150, in dependence of the product identifier information 200 received from the user equipment 20. An example of such a processing in dependence of the product identifier information 200 is schematically shown in FIG. 1.

The telecommunications network 100 is typically able to provide communication services, such as voice communication services to a plurality of users of the telecommunications network 100; for the sake of simplicity, only the user equipment 20 is exemplarily shown in FIG. 1 as a user of the telecommunications network 100—however, the telecommunications network 100 is typically able to provide communication services to many more users. Many such communication services, especially voice-related and/or video-related communication services might correspond to different product variants, depending, e.g., from the user equipment 20 used and/or from the (type of) access used or chosen by the user equipment and/or by the telecommunications network 100.

In the following, the exemplary embodiment shown in FIGS. 2 and 3 are explained in detail:

In a first processing step 210 (corresponding to the first step 210), the register message is transmitted, by the user equipment 20 to the processing entity or functionality 150 (especially corresponding to the proxy call state control function). In a second processing step 211, the processing entity or functionality 150 (or proxy call state control function) transmits the register message (the same or a slightly modified message) to the further processing entity or functionality 151 (especially corresponding to the interrogating call state control function). In a third processing step 212, the further processing entity or functionality 151, transmits a user-authorization request (UAR) message to a repository entity or functionality 160 (of the telecommunications network 100, especially a home subscriber server of the telecommunications network 100 or a unified data repository, UDR, or a unstructured data storage function, UDSF, of the telecommunications network 100), and in a fourth processing step 213, the repository entity or functionality 160 transmits a user-authorization answer (UAA) message to the further processing entity or functionality 151. In a fifth processing step 214, the further processing entity or functionality 151 transmits a register message (the same or a slightly modified message) to still a further processing entity or functionality 152 (especially corresponding to the serving call state control function). In a sixth processing step 215, the still further processing entity or functionality 152, transmits a multimedia-authorization request (MAR) message to the repository entity or functionality 160, and in a seventh processing step 216, the repository entity or functionality 160 transmits a multimedia-authorization answer (MAA) message to the still further processing entity or functionality 152. In an eighth processing step 217, the still further processing entity or functionality 152, transmits a server-assignment request (SAR) message to the repository entity or functionality 160, and in a ninth processing step 218, the repository entity or functionality 160 transmits a server-assignment answer (SAA) message to the still further processing entity or functionality 152. In a tenth processing step 219, the still further processing entity or functionality 152 transmits a message comprising the product identifier information 200 (especially as a 200-OK-message) to the further processing entity or functionality 151. In an eleventh processing step 220, the further processing entity or functionality 151 transmits a message comprising the product identifier information 200 (especially as a 200-OK-message) to the processing entity or functionality 150, and in a twelfth processing step 230 (corresponding to the exemplary embodiment of the second step according to the example shown in FIG. 2) the product identifier information 200 is transmitted to the user equipment 20 as part of the register answer message 230.

In a thirteenth processing step 221, the still further processing entity or functionality 152 transmits a register IMPU message (register IMS public user identity message) to an application server 170. In a fourteenth processing step 222, the application server 170 transmits a corresponding answer message (typically 200 ok message) back to the still further processing entity or functionality 152.

In a fifteenth processing step 310 (corresponding to the third step 310), the invite message (especially a SIP invite message) is transmitted, by the user equipment 20 to the processing entity or functionality 150 (especially corresponding to the proxy call state control function), the invite message comprising the product identifier information 200. In a sixteenth processing step 311, the processing entity or functionality 150 (or proxy call state control function) transmits the invite message (the same or a slightly modified message) to the further processing entity or functionality 151 (especially corresponding to the interrogating call state control function), the invite message comprising the product identifier information 200. In a seventeenth processing step 312, the further processing entity or functionality 151 transmits the invite message (the same or a slightly modified message) to the still further processing entity or functionality 152 (especially corresponding to the serving call state control function), the invite message comprising the product identifier information 200. In an eighteenth processing step 313, the still further processing entity or functionality 152 transmits a message (especially as a 200-OK-message) to the further processing entity or functionality 151. In a nineteenth processing step 314, the further processing entity or functionality 151 transmits a message (especially as a 200-OK-message) to the processing entity or functionality 150, and in twentieth processing step 320, a message (especially as a 200-OK-message) is transmitted to the user equipment 20.

The method according to the present invention might, e.g., be applied to the following exemplary situation:

One service (variant of a product or product family) in the IMS fixed network needs an e2 query, and another service (variant of the same product or product family) does not need it, e.g. an MSAN POTS using a classical PSTN phone versus voice functionality being generated on an IAD (integrated access device); this example might differ per service provider. A similar situation occurs for different products for business subscribers or business products. The profiling (of the different products belonging to the same family or group of products) is typically only different in nuances (today handled mostly by SMML scripts). According to the present invention, the transmission of the product identifier information 200 between the telecommunications network 100 and the user equipment 20 helps to achieve a correct handling of the subroutines and their scaling. This especially means that dedicated P-CSCFs (projectable on other functions or components) for each product variant are no longer required according to the present invention: The same generic P-CSCF instance (as an example of the processing entity or functionality 150) is able to drive the corresponding functions as microservices or VNF-C (VNF components) per product (variant) in the (generic) P-CSCF.

In conventionally known telecommunications networks 100, the dedicated P-CSCFs have to be controlled in a dedicated manner and cannot handle different products differentially, because they do not recognize the product (variant), even if only nuances are different.

The benefit of the product identifier information 200 is as follows: In case that there is a number of (slightly) different products (e.g., for voice-related services in the fixed network, for example one for SIP Trunk, one for cloud PBX, one for voice consumer, one for internal or external access on IP multimedia subsystem), an additional product identifier (information) is needed to allow for a differentiated profiling in the P-CSCF or other related IMS components. According to the present invention, a better scaling of virtual network resources are used in a more optimal manner. The product identifier information 200 is designed in such a way that only one network (or network slice) needs to be used, and on the basis of the product identifier (information), it is advantageously possible to address different procedures in the IP multimedia subsystem. According to the present invention, the customer groups or different services (or different products) inside the IMS core are differentiated for a more efficient service fulfilment. It is, hence, advantageously possible according to the present invention to use one converged IMS core, i.e. resulting in a more simple signaling flow, harmonized network deployment and services. Furthermore, no distinct network elements (for, e.g., retail, business, mobile customers) are needed any more. Additionally, a differentiation of customer/product/services is possible by means of dedicated product/service identifiers, using services (or products) in a shared environment or in the same (network) domain. Furthermore, the product identifier information is able to be extended using parameters such as, e.g., for QoS or Latency.

During the registration procedure according to the specific embodiment shown in FIG. 2, the user equipment 20 receives the product identifier information 200 especially as part of the SIP Registration Response. Especially, this registration procedure applies to or corresponds to the 3GPP 22.229 standardization document.

The product identifier information 200 is able to be exchanged or transmitted in different manners:

E.g. it is able to be exchanged in a new SIP header field P-Product-ID Header (Private-Product-Identifier), especially according to RFC 7315. Thus, the product identifier information 200 might be or be part of a session initiation protocol header or header field, especially as a private-product-identifier header or header field, especially according to RFC 7315. Alternatively, the product identifier information 200 is transmitted as a session initiation protocol uniform resource identifier parameter, SIP URI parameter.

Especially, the product identifier information 200 comprises—besides a product-related information or product-related information content—at least one further parameter or information content, wherein the further parameter or information content is especially related to a quality-of-service level or indication and/or a latency level or indication.

An example of a the product identifier information 200 being transmitted in the form of a private SIP header is provided below:

The syntax of the P-Product-ID header is described as follows:

P-Product-ID="P-Product-ID" HCOLON product-id-spec product-id-spec=(token/quoted-string)*(SEMI product-id-param)

product-id-param=generic-param e.g. P-Product-ID: "PID #1"

The call flow for registration is provided in FIG. 2, and the register answer message 230 (transporting or comprising the product identifier information 200) is especially provided as a SIP Register '200 OK message' of the following form:

200 OK SIP Server→UA

SIP/2.0 200 OK

Via: SIP/2.0/TLS client.biloxi.example.com:5061; branch=z9hG4bKnashd92;received=192.0.2.201

From: Bob <sips:bob@biloxi.example.com>;tag-ja743ks76zlflH

To: Bob <sips:bob@biloxi.example.com>;tag-37GkEhw16

Call-ID: 119FpLxk3uxtm8tn@biloxi.example.com

CSeq: 2 REGISTER

Contact: <sips:bob@client.biloxi.example.com>;expires=3600

Content-Length: 0

P-Product-ID: "PID #1"

The further processing entity or functionality 151 and/or the still further processing entity or functionality 152 (especially realized as I/S-CSCFs) will request the repository entity or functionality 160 for receiving the registration setup of the calling user equipment 20 (UE-A) derived from the user profile including the product identifier (e.g. "Product_1").

During the call setup the UE-A (i.e. the user equipment 20) requests the required service including the product identifier (information) 20 in the SIP INVITE (message).

The associated functions for the product identifier (information) 200 will be reached smoothly without providing service dependent P-CSCF interfaces (i.e. Proxy call state control function instance) or other functions to which the user equipment 20 needs to be connected. Furthermore, it is also advantageously possible to reach customer specific services only based on the existing information (i.e. including the product identifier information 200) in the routing request.

The call flow for the SIP invite process is provided in FIG. 3, and the invite message 310 is especially provided as a SIP INVITE message. In the following, an example showing the form of such a message is provided (however, the iDNS request for resolving the IP-address is not reproduced here):

SIP INVITE Example:

```
INVITE sip:joe@example.com SIP/2.0
  Via: SIP/2.0/UDP 192.0.2.4:5060;
    branch=z9hG4bKnashds7
  To: sip:joe@example.com
  From: sip.ua1@home1.net;tag=456248
  Call-ID: 843817637684230998sdasdh09
  CSeq: 18 INVITE
  Contact: sip:ua1@192.0
  P-Product-ID: "PID #1"
```

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for realizing communication sessions using a telecommunications network and involving at least one user equipment, the method comprising:

receiving, by a processing entity or functionality of the telecommunications network, at least one register message;

generating, retrieving, or requesting, by the processing entity or functionality, product identifier information, wherein the product identifier information indicates a product alternative used by the at least one user equipment out of a plurality of different product alternatives;

transmitting the product identifier information to the at least one user equipment;

receiving, by the processing entity or functionality, at least one invite message from the at least one user equipment, wherein the at least one invite message comprises the product identifier information as a session initiation protocol (SIP) header or an SIP header field; and handling, by the processing entity or functionality, the at least one invite message based on the product identifier information received from the at least one user equipment, wherein handling the at least one invite message based on the product identifier information comprises identifying a correct application or a correct application profile within an application server (AS) or within another IP multimedia subsystem (IMS) component or processing entity or functionality, wherein the handling or processing of respective invite messages is at least partly different dependent on the information content of respective product identifier information of the respective invite messages, and wherein respective information content of respective product identifier information correspond to different components or microservices or sub-functions of the processing entity or functionality being used for at least partly handling or processing respective corresponding requests;

wherein the at least one register message and the at least one invite message are part of a signaling session initiated by the at least one user equipment according to SIP.

2. The method according to claim 1, wherein the at least one invite message comprises the product identifier information as a session initiation protocol uniform resource identifier parameter (SIP URI) parameter.

3. The method according claim 1, wherein the product identifier information is transmitted to the at least one user equipment as part of a register answer message, wherein the register answer message is related to the at least one register message received from the at least one user equipment.

4. The method according to claim 1, wherein the product identifier information is transmitted to the at least one user equipment via:

an autoconfiguration method or mechanism; or a universal integrated circuit card of the at least one user equipment.

5. The method according to claim 1, wherein the processing entity or functionality is or corresponds to a call state control function (CSCF) as part of the telecommunications network;

wherein the processing entity or functionality retrieves or requests the product identifier information from a repository entity or functionality of the telecommunications network.

6. The method according to claim 5, wherein the product identifier information is retrieved or requested via at least one out of the following:

a server assignment request (SAR) and a server assignment answer (SAA), or a hypertext transfer protocol 2.0 (HTTP/2.0) exchange over a service-based interface (Nudr/Nudsf).

7. The method according to claim 6, wherein the repository entity or functionality is or corresponds to a home subscriber server of the telecommunications network or to a unified data repository (UDR) or to an unstructured data storage function (UDSF) of the telecommunications network.

8. The method according to claim 7, wherein the product identifier information is retrieved or requested via:

at least one attribute-value-pair (AVP), an e2 request, or a representational state transfer interface (REST) interface, or a generic database interface between the processing entity or functionality and the repository entity or functionality.

9. The method according to claim 1, wherein the processing entity or functionality is or corresponds to an application server as part of the telecommunications network or associated to the telecommunications network.

10. The method according to claim 1, wherein the telecommunications network is an IMS network.

11. The method according to claim 1, wherein the product identifier information comprises, besides product-related information or product-related information content, at least one further parameter or information content.

12. The method according to claim 11, wherein the further parameter or information content is related to a quality-of-service level or indication and/or a latency level or indication.

13. The method according to claim 1, wherein the SIP header or header field is a private-product-identifier header or header field.

14. The method according to claim 13, wherein the private-product-identifier header or header field is according to RFC 7315.

15. One or more non-transitory computer-readable mediums having processor-executable instructions stored thereon for realizing communication sessions using a telecommunications network and involving at least one user equipment, wherein the processor-executable instructions, when executed, facilitate performance of the following:

receiving, by a processing entity or functionality of the telecommunications network, at least one register message;

generating, retrieving, or requesting, by the processing entity or functionality, product identifier information, wherein the product identifier information indicates a product alternative used by the at least one user equipment out of a plurality of different product alternatives;

transmitting the product identifier information to the at least one user equipment;

receiving, by the processing entity or functionality, at least one invite message from the at least one user equipment, wherein the at least one invite message comprises the product identifier information as a session initiation protocol (SIP) header or an SIP header field; and handling, by the processing entity or functionality, the at least one invite message based on the product identifier information received from the at least one user equipment, wherein handling the at least one invite message based on the product identifier information comprises identifying a correct application or a correct application profile within an application server (AS) or within another IP multimedia subsystem (IMS) component or processing entity or functionality, wherein the handling or processing of respective invite messages is at least partly different dependent on the information content of respective product identifier information of the respective invite messages, and wherein respective information content of respective product identifier information correspond to different components or microservices or sub-functions of the processing entity or functionality being used for at least partly handling or processing respective corresponding requests;

wherein the at least one register message and the at least one invite message are part of a signaling session initiated by the at least one user equipment according to SIP.

16. A system for realizing communication sessions using a telecommunications network and involving at least one user equipment, wherein the system comprises:

a processing entity or functionality of the telecommunications network; and the at least one user equipment;

wherein the processing entity or functionality of the telecommunications network is configured to:

receive at least one register message;

generate, retrieve or request product identifier information, wherein the product identifier information indicates a product alternative used by the at least one user equipment out of a plurality of different product alternatives;

transmit the product identifier information to the at least one user equipment;

receive at least one invite message from the at least one user equipment, wherein the at least one invite message comprises the product identifier information as a session initiation protocol (SIP) header or an SIP header field; and handle the at least one invite message based on the product identifier information received from the at least one user equipment, wherein handling the at least one invite message based on the product identifier information comprises identifying a correct application or a correct application profile within an application server (AS) or within another IP multimedia subsystem (IMS) component or processing entity or functionality, wherein the handling or processing of respective invite messages is at least partly different dependent on the information content of respective product identifier information of the respective invite messages, and wherein respective information content of respective product identifier information correspond to different components or microservices or sub-functions of the processing entity or functionality being used for at least partly handling or processing respective corresponding requests;

wherein the at least one register message and the at least one invite message are part of a signaling session initiated by the at least one user equipment according to a session initiation protocol (SIP).

* * * * *